United States Patent [19]
Duboulet

[11] Patent Number: 5,857,740
[45] Date of Patent: Jan. 12, 1999

[54] SEAT WITH A RETRACTABLE TABLE

[75] Inventor: Claude Duboulet, Evry, France

[73] Assignee: Bertrand Faure Equipements S.A., Boulogne, France

[21] Appl. No.: 897,936

[22] Filed: Jul. 21, 1997

[30] Foreign Application Priority Data

Jul. 22, 1996 [FR] France ................................ 96 09161

[51] Int. Cl.⁶ .................................................. A47B 39/00
[52] U.S. Cl. .......................................... 297/163; 297/173
[58] Field of Search ................................ 297/135, 163, 297/173

[56] References Cited

U.S. PATENT DOCUMENTS

| | | | |
|---|---|---|---|
| 2,173,569 | 9/1939 | Troendle | 155/123 |
| 2,881,039 | 4/1959 | Guzman . | |

FOREIGN PATENT DOCUMENTS

| | | |
|---|---|---|
| 1096521 | 6/1955 | France . |
| 258084 | 9/1926 | United Kingdom . |
| 308946 | 4/1929 | United Kingdom . |
| 291301 | 12/1937 | United Kingdom . |

OTHER PUBLICATIONS

French Search Report dated 24 Mar., 1997, French Appl. No. 9609161 filed 22 Jul. 1996.

*Primary Examiner*—Milton Nelson, Jr.
*Attorney, Agent, or Firm*—Marshall, O'Toole, Gerstein, Murray & Borum

[57] ABSTRACT

The seat includes a back whose rear face is provided with a retractable table hinged thereto and including a strut having a first end pivotally mounted to the rear face of the back for selectively holding the table in a retracted position and in a deployed position. The table also has at least one cam secured to the rear face of the back and possessing a sliding path which co-operates resiliently with the strut, which strut has a second end slidably mounted relative to a guide secured to the table, the sliding path of the cam being curvilinear so as to oppose and enhance in succession the movement of the table from one of its two positions to the other.

10 Claims, 3 Drawing Sheets

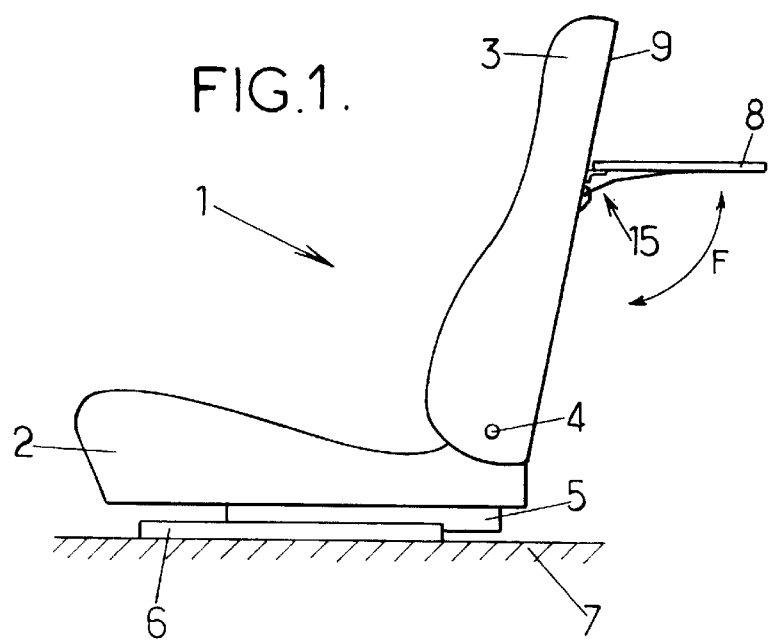
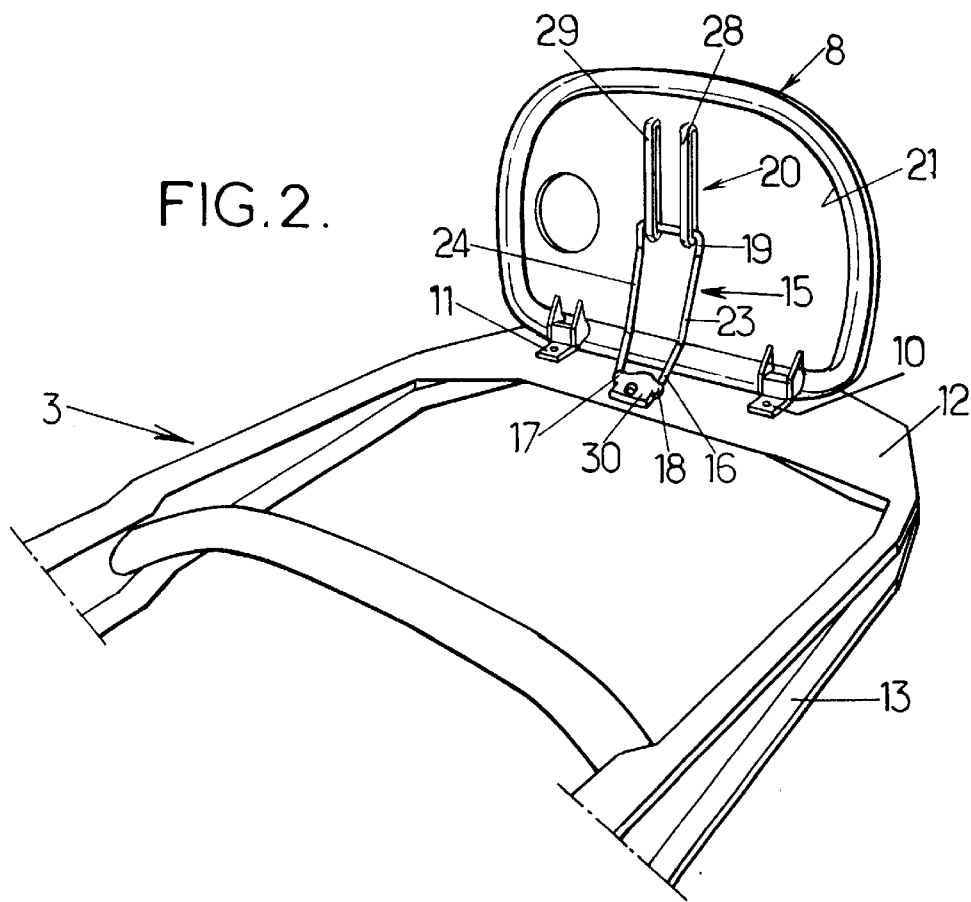

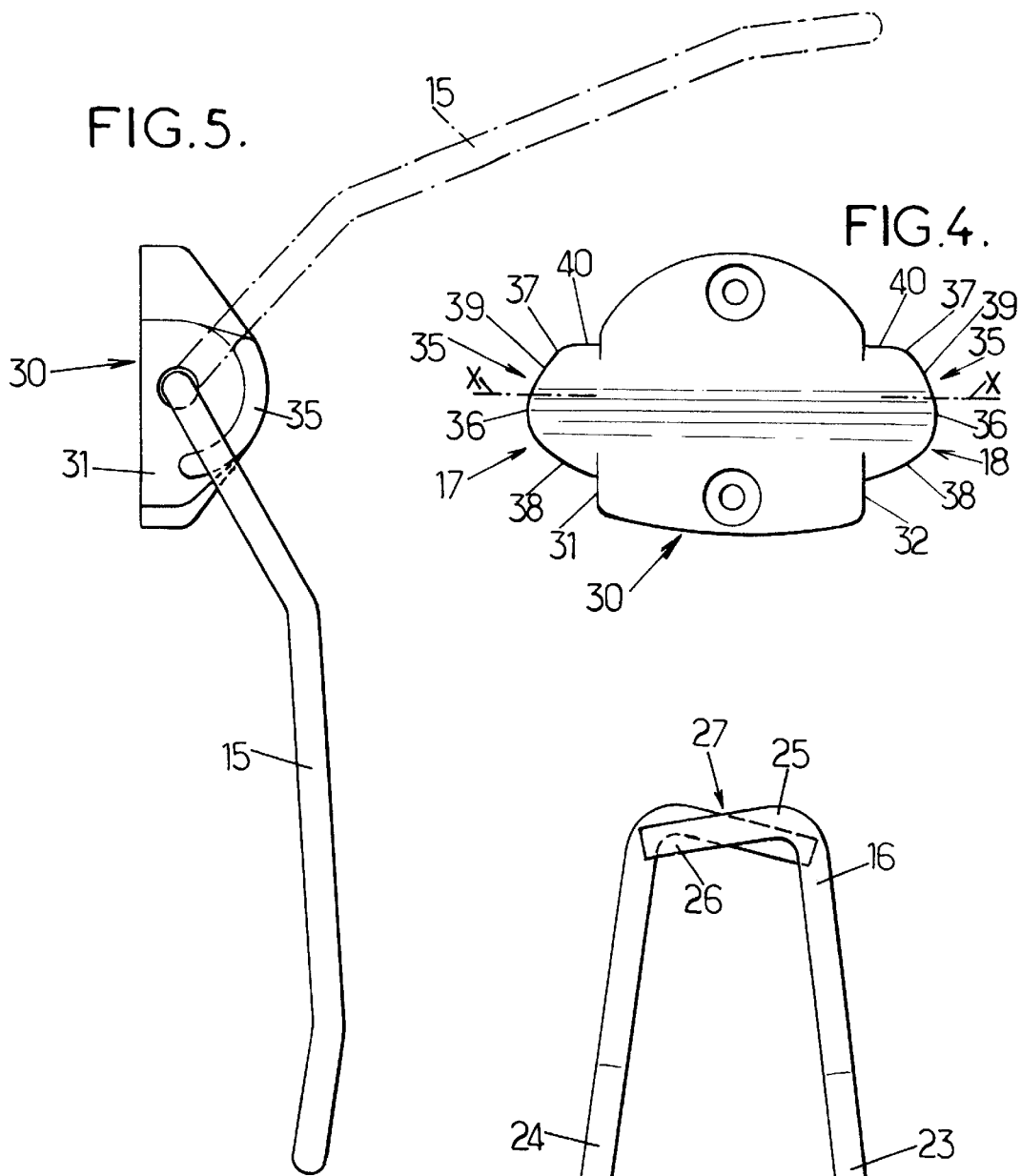

ing a second external force to be exerted in order to cause the table to be deployed, with the first external force being greater than the second external force;

the upper portion of the sliding path comprises, going from the toggle point: a curvilinear length; followed by a length that is substantially flat and parallel to the hinge axis between the strut and the rear face;

the resilience of the two side limbs and the substantially flat shape of the length of the upper portion of the cam are such that in order to retract the table it is necessary to exert an external force in excess of 5 kg;

the two side limbs are bent towards the table so that they have concave sides facing away form the table, with this shape for the two limbs of the strut making it possible to minimize the volume occupied by the strut under the table, level with the knees of a user;

the two curved free ends of the strut are pivotally mounted in a fork which is fixed to the rear face of the back and which carries two cams each provided with a respective sliding path, the two cams being disposed symmetrically about a transverse midplane of the fork; and when the table is in the deployed position, the web of the strut is in an abutment position in the slideway and said web is held resiliently without slack in its abutment position by the two side limbs of the strut which are resiliently pressed against the cams.

SEAT WITH A RETRACTABLE TABLE

FIELD OF THE INVENTION

The present invention relates to a seat including a back which has a rear face provided with a retractable table.

In particular, the invention relates to a motor vehicle seat including a back having a rear face provided with a retractable table hinged to move between a retracted position in which the table is substantially parallel to the rear face of the back and a deployed position in which the table is substantially perpendicular to the rear face of the back, the table having a strut with a first end pivotally mounted on the rear face of the back to hold the table selectively in each of said retracted and deployed positions.

BACKGROUND OF THE INVENTION

In known vehicle seats, the strut is the bottom rod of a resilient telescopic arm whose two ends are pivotally mounted respectively on the rear face of the back and on the bottom face of the retractable table.

The arm is compressed when the table is retracted and it is extended when the table is in its deployed position, and in that position it holds the table substantially perpendicular to the rear face of the back.

Unfortunately, such an arm is relatively expensive.

In addition, when the table is in its deployed position, the arm possesses a degree of operating slack that rattles while the vehicle is moving.

OBJECTS AND SUMMARY OF THE INVENTION

A particular object of the present invention is to remedy the above-mentioned drawbacks by proposing a vehicle seat provided with a retractable table that is easy to operate and low in price while also improving user comfort.

To this end, in a seat of the kind defined above the back further includes at least one cam secured to the rear face of the back and possessing a sliding path that co-operates resiliently with the strut, which strut has a second end slidably mounted relative to a guide secured to the table, the sliding path of the cam being curvilinear so as to oppose and then to enhance, in succession, movement of the table from one of its retracted and deployed positions towards the other one of said two positions.

The seat of the invention may optionally further include one or more of the following characteristics:

the strut comprises a metal rod folded generally into a U-shape having a web which slides in at least one slideway constituting said guide, and two side limbs which extend towards the rear face of the back from the web, in order to be pivotally mounted on said rear face, with the cam co-operating with at least one of the two side limbs;

at least the side limb of the strut which cooperates with the cam is elastically deformable parallel to the rear face of the back, the cam being convex in shape;

each of the two side limbs of the strut has a free end which is curved towards the other free end to define a hinge axis for the strut relative to the rear face of the back;

the cam possesses a sliding path including a toggle point beyond which there extend both upper and lower slideway portions of different shapes, the upper portion requiring a first external force to be exerted in order to cause the table to retract, and the lower portion requir-

BRIEF DESCRIPTION OF THE DRAWINGS

An embodiment of the invention is described below with reference to the accompanying drawings, in which:

FIG. 1 is a side view of a motor vehicle seat provided with a retractable table of the present invention, the table being shown in its deployed position;

FIG. 2 is a perspective view of the framework of the back of the seat shown in FIG. 1, with the retractable table being held in its deployed position by a strut and by two cams;

FIG. 3 is a plan view of the FIG. 2 strut;

FIG. 4 is a plan view of the two cams of FIG. 2 mounted on a fork;

FIG. 5 is a side view of the FIG. 4 fork carrying the FIG. 3 strut;

MORE DETAILED DESCRIPTION

Figure 6:
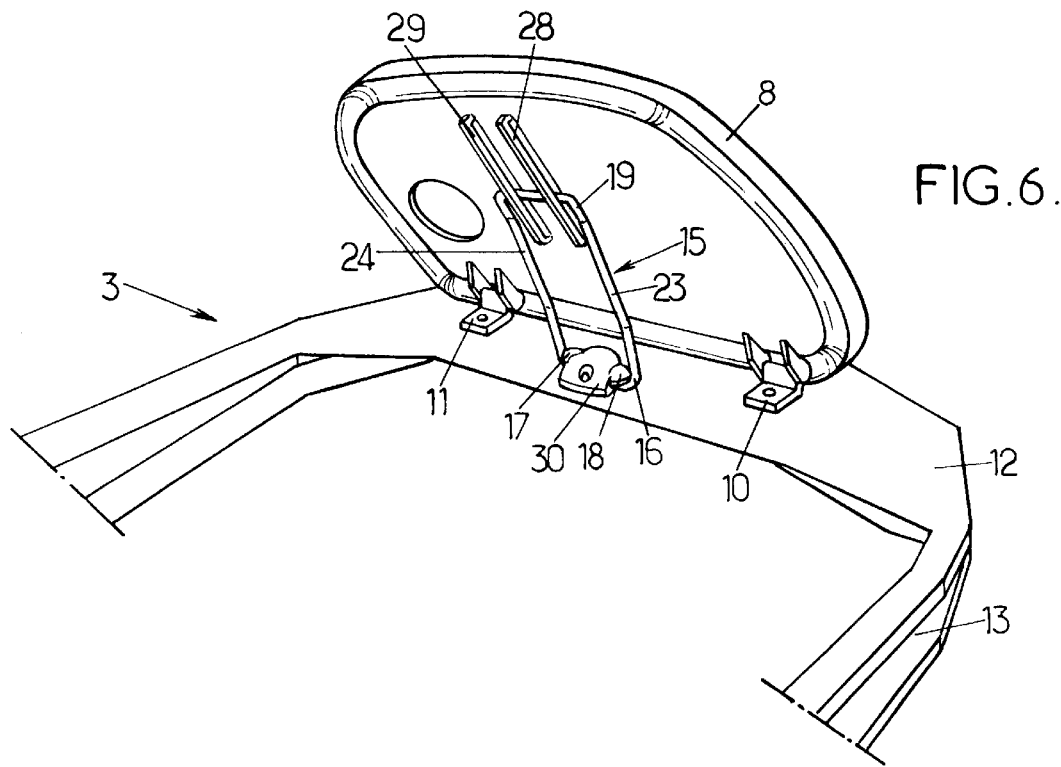
FIG. 6 is a perspective view of the table in an intermediate position between its retracted position and its deployed position.

The motor vehicle seat 1 shown in FIG. 1 comprises, in conventional manner, a seat proper 2 and a seat back 3 pivotally mounted on the framework of the seat proper about a transverse horizontal axis 4, thereby enabling the inclination of the back 3 to be adjusted. The seat proper 2 is slidably mounted on the floor 7 of the motor vehicle via at least one slideway 5, 6 for longitudinal adjustment.

Figure 7:
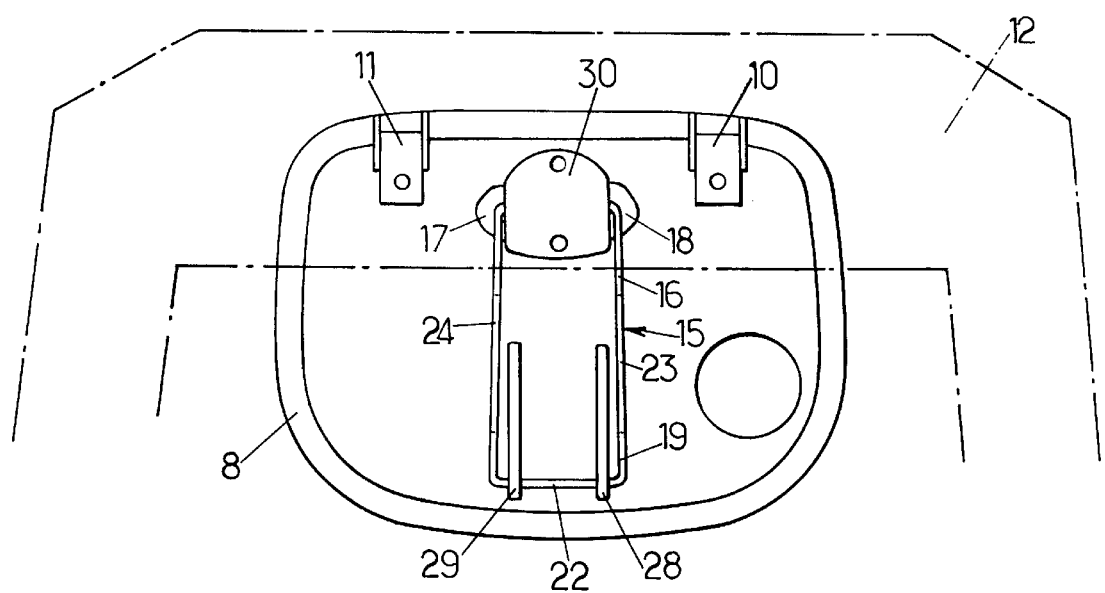
FIG. 7 is a face view of the back, the table being shown as though it were transparent and in its retracted position against the framework of the back.

A retractable table 8 is hinged to move in the directions of double-headed arrow F relative to the rear face 9 of the back 3. The retractable table 8 is hinged between a deployed position in which it is substantially perpendicular to the rear face 9, as shown in FIG. 1, and a retracted position in which it is substantially parallel to said rear face 9 (FIG. 7).

The table 8 pivots relative to the rear face of the back via two hinges 10 and 11 fixed to a top cross-member 12 of the framework 13 of the back, as shown in FIG. 2.

The table 8 is held selectively in each of its retracted and deployed positions by means of a strut 15 having a first end 16 pivotally mounted to the rear face 9 of the back.

According to the present invention, two cams 17 and 18 secured to the rear face 9 of the back are provided with respective sliding paths that co-operate resiliently with the strut 15 in the vicinity of the first end 16 thereof.

In addition, the second end 19 of the strut 15 is slidably mounted relative to a guide 20 secured to the bottom face 21 of the table 8.

The strut 15 shown in FIG. 3 is constituted by a metal rod that is folded so as to be generally U-shaped, having a web 22 and two side limbs 23 and 24 which extend from the web 22. The two limbs 23 and 24 have respective free ends 25 and 26 which are curved towards each other.

The two side limbs 23 and 24 are also resiliently deformable parallel to the rear face 9 of the back 3 and they are bent towards the table 8 so that they have concave sides facing away from the table.

The two ends 25 and 26 of the limbs 23 and 24 constitute the first end 16 of the strut 15, and together they form a hinge axis 27 for said strut relative to the rear face 9 of the back 3.

The web 22 constitutes the second end 19 of the strut 15 and it slides in the guide 20 formed by two slideways 28 and 29 integrally formed with the bottom face 21 of the table (FIG. 2).

The hinge axis 27 is carried by a fork 30 (shown in FIG. 4) which is itself fixed by any appropriate means to the rear face of the top cross-member 12 of the framework 13 of the back 3.

The two side faces 31 and 32 of the fork 30 have respective cams 17 and 18 of convex shape and symmetrical about a transverse midplane of the fork.

FIGS. 4 and 5 show that each of the cams 17 and 18 possesses a sliding path 35 which includes a toggle point 36.

For each of the two cams, a top sliding portion 37 and a bottom sliding portion 38 extends away from a respective side of the toggle point 36.

The two sliding portions 37 and 38 may advantageously be of different shapes. The bottom sliding portion 38 is curvilinear in shape with its radius of curvature varying regularly, whereas the top sliding portion 37 comprises the following, going from the toggle point 36:

- a curvilinear length 39 in which the radius of curvature varies regularly; and
- a substantially flat length 40 parallel to the longitudinal axis X—X of the fork which is itself parallel to the hinge axis 27 of the strut 15 to the framework 13.

FIG. 3 shows that when the strut 15 is not carried by the fork 30, the two side limbs 23 and 24 of the strut 15 converge because they are resilient. When the strut 15 is mounted on the fork 30, the two limbs 23 and 24 are spread apart by the body of the fork so that their resilience enables said limbs to follow the sliding path of the cams 17 and 18 carried by said fork 30 as closely as possible.

While the strut 15 is moving relative to the fork, the two side limbs 23 and 24 are splayed apart to a greater or lesser extent by the cams 17 and 18, thereby varying the inter-axis distance that exists between the two curved ends 26 and 27 of said two side limbs 23 and 24.

Moving the table 8 from its deployed position to its retracted position, and vice versa, is now described with reference to FIGS. 2 and 4 to 7.

When the table 8 is in its deployed position, i.e. when it is substantially perpendicular to the rear face 9 of the back 3, the strut 15 is in the position shown in chain-dotted lines in FIG. 5. Its two limbs 23 and 24 bear against the substantially flat lengths 40 of the cams 17 and 18 while the second end 19 of the strut 15 is in rear abutment in the slideways 28 and 29 of the table 8.

This deployed position of the table 8 is a stable position without slack. The resilience of the two side limbs 23 and 24 and the flat shape of the lengths 40 of the two cams 17 and 18 make it possible to hold the table 8 in the deployed position with said table carrying loads that may be as great as 5 kg.

When it is desired to fold down the table 8, i.e. when it is desired to put into its retracted position, it is necessary to exert a force thereon in excess of 5 kg to cause its side limbs 23 and 24 to splay apart under action of the cams 17 and 18. These two side limbs then spread apart and follow the upper curvilinear length 39 until they reach the toggle point 36 of each of said cams, as shown in FIG. 6. After passing this toggle point 36, the two side limbs 23 and 24 follow the bottom curvilinear paths 38 of the cams 17 and 18, thereby enabling them to move towards each other.

No further external action is required on the table to cause the two limbs 23 and 24 to move towards each other, since they do so under their own resilience, thus bringing the table to its retracted position as shown in FIG. 7. In addition, the table 8 is automatically held in its retracted position by the two limbs 23 and 24 pressed against the rear face 9 of the back 3.

When it is desired to redeploy the table 8, it suffices to exert an upwardly-directed external force on the table. The external force must be maintained until the two side limbs 23 and 24 reach the toggle point 36, where the limbs are maximally spread apart by the action of the bottom sliding portions 38 of the two cams 16 and 17. The resilience of the two side limbs 23 and 24 and the shape of the top portions 37 of the two cams subsequently ensure that the table completes its upwards movement without further external force and becomes locked in its deployed position.

The shape of the bottom sliding portion 38 of each of the two cams 17 and 18 requires only a relatively small external force to be exerted on the table 8 in order to deploy the table, and in any event the force required is much less than the external force which needs to be exerted to retract the table.

In a variant, it is possible for a plurality of cam lengths occupying a plurality of catches on the guide 20 so as to make it possible to adapt the deployed position of the table as a function of the inclination of the back 3.

I claim:

1. A seat including a back having a rear face provided with a retractable table hinged to move between a retracted position in which the table is substantially parallel to the rear face of the back and a deployed position in which the table is substantially perpendicular to the rear face of the back, the table having a strut with a first end pivotally mounted on the rear face of the back to hold the table selectively in each of said retracted and deployed positions, wherein the back further includes at least one cam secured to the rear face of the back and possessing a sliding path that co-operates resiliently with the strut, which strut has a second end slidably mounted relative to a guide secured to the table, the sliding path of the cam being curvilinear so as to oppose and then to enhance, in succession, movement of the table from one of its retracted and deployed positions towards the other one of said two positions.

2. A seat according to claim 1, in which the strut comprises a metal rod folded generally into a U-shape having a web which slides in at least one slideway constituting said guide, and two side limbs which extend towards the rear face of the back from the web, in order to be pivotally mounted on said rear face, with the cam co-operating with at least one of the two side limbs.

3. A seat according to claim 2, in which the two side limbs are bent towards the table so that they have concave sides facing away from the table.

4. A seat according to claim 2, in which each of the two side limbs of the strut has a free end which is curved towards the other free end to define a hinge axis for the strut relative to the rear face of the back.

5. A seat according to claim 4, in which the two curved free ends of the strut are pivotally mounted in a fork which is fixed to the rear face of the back and which carries two cams each provided with a respective sliding path, the two cams being disposed symmetrically about a transverse midplane of the fork.

6. A seat according to claim 5, in which, when the table is in the deployed position, the web of the strut is in an abutment position in the slideway and said web is held resiliently without slack in its abutment position by the two side limbs of the strut which are resiliently pressed against the cams.

7. A seat according to claim 2, in which at least the side limb of the strut which co-operates with the cam is elastically deformable parallel to the rear face of the back, the cam being convex in shape.

8. A seat according to claim 7, in which the sliding path of the cam includes a toggle point beyond which there extends both upper and lower slideway portions of different shapes, the upper portion requiring a first external force to be exerted in order to cause the table to retract, and the lower portion requiring a second external force to be exerted in order to cause the table to be deployed, with the first external force being greater than the second external force.

9. A seat according to claim 8, in which the upper portion of the sliding path comprises, going from the toggle point: a curvilinear length; followed by a length that is substantially flat and parallel to the hinge axis for the strut relative to the rear face.

10. A seat according to claim 9, in which the resilience of the side limb which cooperates with the cam and the substantially flat shape of the length of the upper portion of the cam are such that in order to retract the table it is necessary to exert an external force in excess of 5 kg.

* * * * *